United States Patent [19]

Kilis et al.

[11] Patent Number: 5,167,506
[45] Date of Patent: Dec. 1, 1992

[54] INHALATION DEVICE TRAINING SYSTEM

[75] Inventors: David Kilis, St. Paul; Charles J. Matson, Stillwater, both of Minn.

[73] Assignee: Minnesota Mining and Manufacturing Company, St. Paul, Minn.

[21] Appl. No.: 782,080

[22] Filed: Oct. 24, 1991

[51] Int. Cl.$^5$ .......................... G09B 23/28; A61B 5/08
[52] U.S. Cl. ..................... 434/262; 128/725; 364/413.02
[58] Field of Search ........... 434/262; 128/725, 200.14; 364/413.02, 413.03, 413.04

[56] References Cited

U.S. PATENT DOCUMENTS 4,984,158 1/1991 Hillsman ............................ 128/725

FOREIGN PATENT DOCUMENTS 9023282.8 10/1990 United Kingdom .

OTHER PUBLICATIONS

D. Smith, *Practitioner*, 232:507, 510 (1988).
Coady et al., *Practitioner*, 217:273-275 (1976).
Newman et al., *J. Royal Soc. Med.*, 73:776-779 (1980).
Shim et al., *Am. J. Med.*, 69:891-894 (1980).
Barron, *Today's Therapeutic Trends*, 6(2):13-17 (1988).
McElnay et al., *J. Clin. Pharm. Therap.*, 14:135-144 (1989).
Vitalograph brochure, Catalog No. 42,400, 12 pages.
A.I.M. The Effective Way to Train Patients in the Use of Metered Dose Inhalers.
Dolovich et al., "Optimal Delivery of Aerosols from Metered Dose Inhalers", Lung Mucociliary Clearance, Chest, 80: 6, (Dec. 1981 Supplement), pp. 911-915.
Folke Marea et al., "Aerosols in Medicine", "Principles, Diagnosis and Therapy" pp. 196, 210, 331-332.
Clarke et al., "Aerosols and the Lung", (1984), pp. 213 and 223.

*Primary Examiner*—John G. Weiss
*Attorney, Agent, or Firm*—Gary L. Griswold; Walter N. Kirn; Jeffrey J. Hohenshell

[57] ABSTRACT

An interactive system for training a patient in the use of an inhalation device. The system includes a pre-training module in which one or more performance parameters are established in a patient-specific manner, and a training module in which actual performance parameters are monitored and compared to parameters established in the pre-training module.

5 Claims, 5 Drawing Sheets

MDI PRE-TRAINING SESSION

YOU ARE NOW GOING TO HAVE 2 PRE-TRAINING TRIALS OF YOUR USE OF THE MDI DEVICE (NOTE: EACH TRIAL WILL TAKE ABOUT 30 SECONDS.)

PLEASE PICK UP THE MDI AT THIS TIME.

YOU WILL NOW DO THE FOLLOWING.

1. EXHALE THE AIR FROM THE LUNGS.
2. PLACE THE MOUTH PIECE BETWEEN YOUR LIPS MAKING A TIGHT SEAL.
3. INHALE AND PRESS THE MDI BUTTON.
4. HOLD YOUR BREATH FOR ABOUT 10 SEC. KEEP MOUTH PIECE BETWEEN LIPS.
5. SLOWLY EXHALE THROUGH MOUTH PIECE.

- INHALE AND EXHALE THROUGH THE MOUTH PIECE -

IF YOU ARE READY, BEGIN - TRIAL #1    START.NOW

Fig. 3

METERED-DOSE INHALER (MDI)

1. MANY ARE USED FOR MEDICATION
2. THEY ARE HIGHLY EFFECTIVE.
3. EARLY MDI'S REQUIRE COORDINATION.
4. ADVANCES HAVE RESULTED IN BREATH-ACTUATED DEVICE.

INHALATION DEVICE TRAINING SYSTEM

TECHNICAL FIELD

This invention relates to the use of inhalation devices for the administration of medicament in the form of aerosolized solid particles or droplets of liquid or dispersion. In particular the invention relates to systems and approaches for training patients in the use of such devices.

BACKGROUND OF THE INVENTION

Asthma and other respiratory diseases have long been treated by the inhalation of appropriate medicament. For many years the two most widely used and convenient choices of treatment have been the inhalation of medicament from a drug solution or suspension in a metered dose pressurized inhaler (MDI), or inhalation of powdered drug generally admixed with an excipient, from a dry powder inhaler (DPI).

Inhalation medicament therapy is the treatment of choice for most patients with air flow obstruction. Since the inhaled dose is typically small, side-effects are few and the onset of medicament action is rapid. However, unlike most forms of medicament therapy, the success of aerosol therapy requires that the patient master relatively complex techniques in order to consistently inhale the medicament effectively into the lung.

Even with good technique, it has been estimated that only a small proportion, e.g., 8-10%, of the administered dose will reach the lung, since approximately 80% of the dose will impact ineffectually on the oropharynx and 10% will escape. See, e.g., D. Smith, *Practitioner*, 232:507, 510 (1988). Consequently, efficacy is dependent on proper inhalation technique and proper use of the medicament delivery device.

Numerous studies have documented problems associated with the correct use of metered dose inhalation (MDI) devices. One common difficulty involves a "hand-lung" dysfunction problem, which amounts to an inability on the part of the patient using the device to coordinate actuation of the device at the proper time during inhalation. It has been estimated that many, if not a majority, of patients improperly use their devices on occasion, and therefore can receive an inadequate dose of medication.

The optimal sequences of patient maneuvers for the proper use of devices are known. However, ensuring patient compliance with such maneuvers has proven to be a significant problem. It has been shown that training can improve patient performance, as well as pulmonary function, as a result of better delivery of medicament to the airways. It has also been demonstrated that young children and the very elderly can also be trained to correctly use devices. Inevitably however, repeated training is needed to ensure compliance in the use of such devices.

A number of systems and approaches have been described for training in the use of inhalation devices. See, e.g., Coady et al., *Practitioner*, 217:273-275 (1976), Newman et al., *J. Royal Soc. Med.*, 73:776-779 (1980), Shim et al., *Am. J. Med.*, 69:891-894 (1980), Barron, *Today's Therapeutic Trends*, 6(2):13-17 (1988), and McElnay et al., *J. Clin. Pharm. Therap.*, 14:135-144 (1989).

U.S. Pat. No. 4,984,158 (Hillsman) describes a metered dose inhaler biofeedback training and evaluation system that involves a visual and auditory biofeedback system that displays certain respiratory parameters along with real time performance or optimal performance. The system however is based on such parameters as (1) the integration of measured inspiration and expiration airflow in order to provide signals based on volume, and (2) the determination of a cyclic expiration point representative of lung exhaustion.

In terms of systems presently available, Vitalograph (Lenexa, Kans.) markets a product called "A.I.M." (Aerosol Inhalation Monitor), which is described as an incentive device using cartoon-like characters for training patients. The feedback to the patient involves a meter and a series of lights that signal correct or incorrect use of the MDI.

Vitalograph also markets "MDI-Compact" which combines an electronic spirometer with inhalation monitoring, and employs a visual screen.

It is apparent that inhalation medicament delivery devices can only achieve their full potential benefit to the patient if the patient is able to produce a near optimum inhalation maneuver on a regular basis. Consequently, it would be desirable to be able to improve the ability of a patient to practice using such a device, without actual drug delivery but with an indication of the acceptability of his or her performance.

It would be particularly desirable, in terms of more closely achieving true biofeedback, to have the option of having certain parameters of the patient's performance be evaluated in comparison to values that are specific to that patient, rather than by comparison to values that are somehow predetermined for the patient (e.g., either by a trainer/operator, or in the construction of the system itself).

SUMMARY OF THE INVENTION

The present invention provides an interactive system for training a patient in the use of an inhalation device, the system comprising the following modules:

(1) a device comprising a housing defining a chamber in communication with a patient port in the form of a mouthpiece or nasal adaptor, aerosolization means for simulating the formation of an aerosol of medicament in the chamber, actuation means to actuate the aerosolization means, and a sensor that continuously measures the inhalation flow rate during inhalation through the patient port and provides an electrical signal which varies continuously with the flow rate, the electrical signal being useful for monitoring one or more of the following performance parameters:
   - (a) inspiration flow rate;
   - (b) firing time of the inhalation device;
   - (c) length of inspiration;
   - (d) length of breath hold; and
   - (e) expiration flow rate;

(2) pre-training means wherein at least one of the parameters is established as a patient-specific parameter, and the remaining parameters are established either as fixed parameters or patient-specific parameters;

(3) training means for
   - (i) collecting patient information relative to the parameters,
   - (ii) comparing the training parameters with the parameters established in pre-training, and
   - (iii) establishing patient prompts with respect to the comparison; and (4) display means to enable the patient to monitor in real time either the training parameters, the comparison, and/or the prompts.

Preferably, performance parameters (c) and (d) are patient-specific, and the remaining parameters, (a), (b), and (e), are predetermined at or before the time of pre-training.

Optionally, and preferably, modules (3) and (4) above can be repeated, with or without a real time display, in order to improve performance or evaluate compliance.

Optionally, and preferably, the system also includes a tutorial module demonstrating the proper use of inhalation devices.

The system involves the use of hardware and software linked together as a computer based real-time data acquisition and analysis system that provides for an interactive exchange between the patient and the system. The system makes possible the optional inclusion of tutorial instruction on the proper use of inhalation devices, in addition to the training session itself, during which the patient is able to practice proper use. The training session provides positive feedback to the patient about their performance in using the device, as well as information on how to correct any errors they may be making.

BRIEF DESCRIPTION OF THE DRAWING

The invention will now be described with reference to the accompanying Drawing in which:

FIG. 3 depicts a representative pre-training display screen.

DETAILED DESCRIPTION

Figure 2:
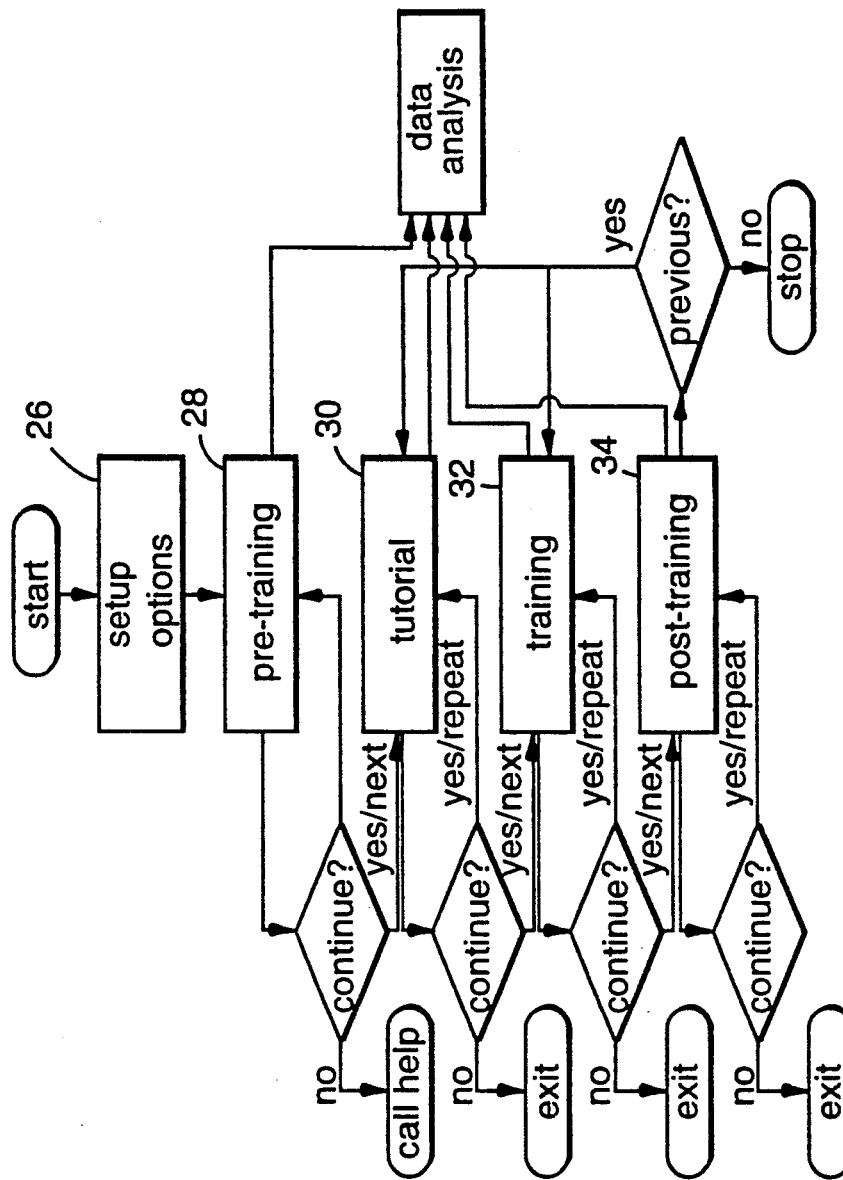
FIG. 2 depicts a flowchart showing a preferred training system.

The present invention provides an interactive system for training a patient in the use of an inhalation device, the system comprising the following modules:

(1) a device comprising a housing defining a chamber in communication with a patient port in the form of a mouthpiece or nasal adaptor, aerosolization means for simulating the formation of an aerosol of medicament in the chamber, actuation means to actuate the aerosolization means, and a sensor that continuously measures the inhalation flow rate during inhalation through the patient port and provides an electrical signal which varies continuously with the flow rate, the electrical signal being useful for monitoring one or more of the following performance parameters:
  (a) inspiration flow rate;
  (b) firing time of the inhalation device;
  (c) length of inspiration;
  (d) length of breath hold; and
  (e) expiration flow rate;

(2) pre-training means wherein at least one of the parameters is established as a patient-specific parameter, and the remaining parameters are established either as fixed parameters or patient-specific parameters;

(3) training means for
  (i) collecting patient information relative to the parameters,
  (ii) comparing the training parameters with the pre-training parameters, and
  (iii) establishing patient prompts with respect to the comparison; and (4) display means to enable the patient to monitor in real time either the training parameters, the comparison, and/or the prompts.

Devices and sensors suitable for use in the system of the present invention include those described in Assignee's co-pending application entitled "Inhalation Device", U.K. Serial No. 90.23282.8, filed Oct. 25, 1990, the disclosure of which, including its cited references, are incorporated herein by reference. This application describes a sensor breath-actuated inhaler which continuously measures inhalation flow rate during inhalation and provides an electrical signal that varies continuously with flow rate.

Also described in the above-cited U.K. application is a portable inhalation device for administration of medicament in the form of aerosolized fine particles or droplets of liquid or suspension to the respiratory system of a patient, the device comprising a housing defining a chamber in communication with a patient port in the form of a mouthpiece or nasal adaptor, medicament aerosolization means for forming an aerosol of medicament in the chamber, control means to actuate the medicament aerosolization means and a sensor which continuously measures the inhalation flow rate during inhalation through the patient port and provides an electrical signal to the control means which varies continuously with said flow rate, the electrical signal being used by the control means for one or more of the following functions:
  (i) to calibrate the device such that the medicament aerosolization means is actuated at a precise, predetermined flow rate,
  (ii) to monitor one or more of the parameters:
    (a) flow rate at different times during inhalation,
    (b) rate of increase of flow rate during inhalation,
    (c) inhaled volume during inhalation, and presenting and/or storing information relative to the parameter and/or activating the medicament aerosolization means when a predetermined parameter is attained.

Sensors that permit continuous measurement of the inhalation flow rate can take the form of flow sensors, e.g., those which measure the cooling effect of an air flow or those which measure the speed of rotation of a turbine in the air stream, or pressure differential transducers. The essential characteristic of such sensors is that they have an electrical output that varies continuously with flow rate.

The devices of the invention can be of any suitable type, e.g., the dry powder type, pressurized aerosol type, or other aerosol generators. The software useful with the system provides tremendous flexibility to the system such that various aerosol drug delivery devices can be accommodated within the above training concept. Standard press and breathe, breath actuated, and powder delivery devices can all be taught to the patient. In fact, any device that requires the patient to inhale through it can be interfaced to the system for training purposes.

The output from the sensor is fed to either an analog comparator circuit or to digital electronics, depending upon the degree of sophistication of its intended use, which may include monitoring the following:

(a) inspiration flow rate;
(b) firing time of the inhalation device;
(c) length of inspiration;
(d) length of breath hold; and
(e) expiration flow rate.

Any of these performance parameters can be patient-specific, e.g., parameters (a) through (e) individually, as well as combinations of two, three, four, or all five parameters. In this manner, there exist on the order of thirty-one possible combinations of patient-specific parameters, including their use individually.

Preferably, the combination of performance parameters (c) and (d) are patient-specific, and the remaining parameters, (a), (b), and (e), are predetermined at or before the time of pre-training. The term "patient-specific", as used herein, means that the parameter is determined on the basis of actual performance by the particular patient in the course of a pre-training module. In this way, the system is "customized" for a particular patient, as opposed to having someone other than the patient (e.g., an operator or other health care provider) predetermine (e.g., fix or pre-set) the particular parameter, e.g., by estimation, or by the use of a standard value. In this way the entire system can be used without any operator assistance or input, thereby eliminating any chance of operator bias or error, or inconsistency between operators.

Figure 1:
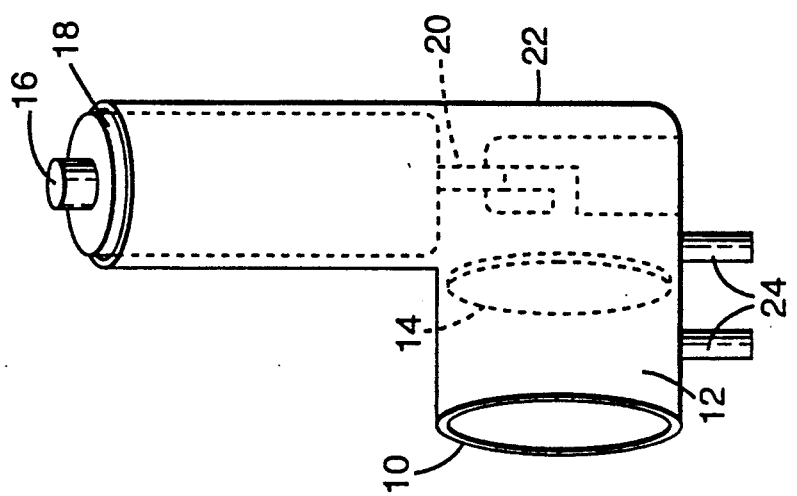
FIG. 1 depicts a perspective view of a device of the present invention.

The invention will be further described with reference to the Drawing. In FIG. 1 there is shown a perspective view of a device of the present invention. When the patient inhales through the mouthpiece (10) an airflow is established from an air inlet through chamber (12) to the mouthpiece, which airflow impinges upon flow sensor (14). The signal generated by flow sensor (14) is conveyed via electrical conductors (not shown) to an electronic controller, e.g., a computer, that monitors the signal. Also shown are actuator button (16), canister (18), nozzle (20), and plastic housing of the MDI (22), as well as the connecting ports (24) to the pneumotach tubing.

The preferred system involves the use of standardized set of instructions and training so that all patients receive identical training. This serves to free the time of the health care provider as well as to lessen the chance for error due to different locales, times, operators (e.g., health care providers), and the like. Thus, all patients within and across various clinical settings can be similarly trained and compared.

Using a device as described above to measure air flow, the system can be further modified to incorporate software to collect data and interact with the patient in real time. The software aspects of such a system can include, for instance, a story-like pictorial presentation of information on the correct use of the device, and an explanation of what happens if used incorrectly, and software for real-time data acquisition and subject interaction. Suitable software for real time data acquisition is known to those skilled in the art and is available, e.g., as "Asyst TM" software, available from Asyst Software Technologies (Rochester, N.Y.). Optionally, the acquired data can be input into an appropriate statistical program for further evaluation. Also optionally, the system can include software for standard spirometric evaluation.

FIG. 2 illustrates the flowchart logic for a preferred system of the present invention. A setup menu (26) is preferably provided to the operator for option selection, thereby enabling the system to be configured for various preferences and different devices. The system can be organized into the following time frames: pre-training (28) module(s), training module(s) (32), and post-training module(s) (34). Optionally, the system can include a tutorial module (30) that demonstrates the proper use of inhalation devices.

The present invention provides pre-training means wherein at least one of the performance parameters described above is established as a patient-specific parameter, and the remaining parameters are established either as fixed, e.g., operator-determined, parameters or patient-specific parameters. The patient could be a first time user or an experienced user. The objective of the pre-training module is to establish a baseline performance level that can be compared to training and/or post-training performance as an index of overall efficiency of learning. In addition, this module will serve as an initial test to screen for those patients that are mechanically dysfunctional to the extent that they may first require personal intervention by the health care provider before commencing the training module of the system.

Figure 6:
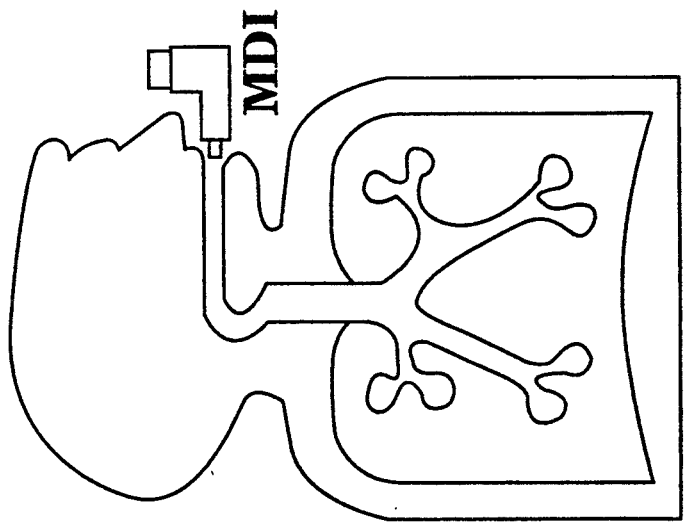
FIG. 6 depicts a representative tutorial display screen.

An optional, and preferred, preliminary module that the patient can enter is a tutorial module, e.g., an animated pictorial presentation describing the drug delivery device and its proper use. This module can provide other information as well, e.g., how to load their device with the drug canister, and how to keep the device clean. It can also explain to the patient the biological ramifications of correct, as opposed to incorrect, medicament inhalation. FIG. 6 depicts the type of pictorial and written information that can be presented to the patient on the same display screen as the pre-training and training modules. In addition, there can be audio and visual input to the patient, where appropriate, to maximize training value.

The system of the present invention further provides training means for
 (i) collecting patient information relative to the parameters,
 (ii) comparing the training parameters with the pre-training parameters, and
 (iii) establishing patient prompts with respect to the comparison.

Figure 4:
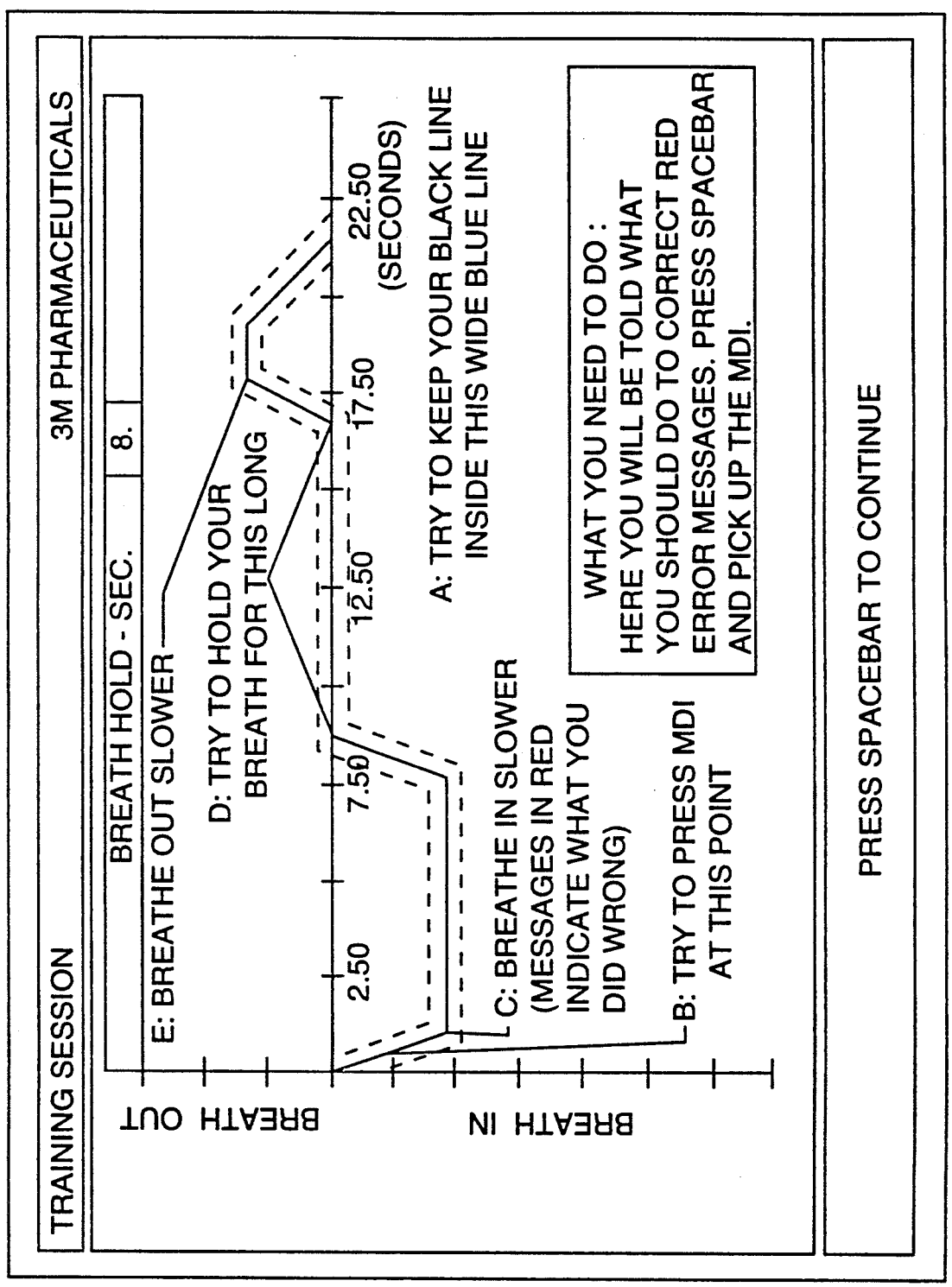
FIG. 4 depicts a representative training display screen.
Figure 5:
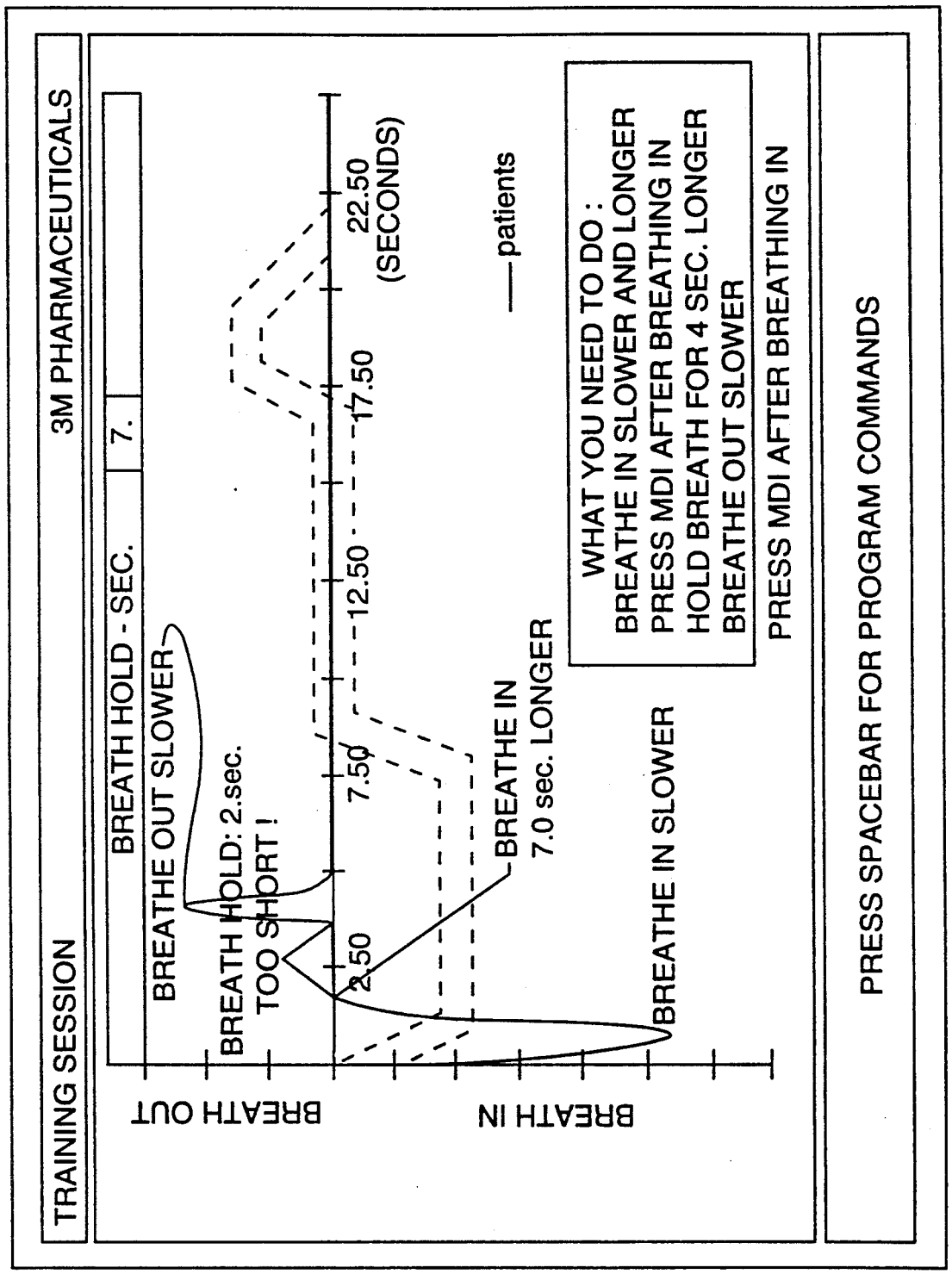
FIG. 5 depicts the display of FIG. 4, showing also the actual performance pattern of a patient.

Within the training module, the patient will typically see several display screens, as well as various prompts, all designed to assist the patient with learning the proper technique for inhaling drug from the device. FIGS. 4 and 5 depict representative screens of the type that can be used, including examples of the interactive dialogue that can take place between patient's performance and computer analysis of that performance.

FIG. 4 would typically be among the first screens to be encountered in the training module. At the top of the screen there can be seen an indication of which module the patient is currently in. The grid portion of the screen is set to show the patient's air flow waveform in real-time. The Y axis represents air flow (e.g., calculated in liters per minute). The X axis shows time in seconds. FIG. 4 also shows, as parallel dotted lines, the area that represents the idealized breathing pattern for the patient, determined as a result of the pre-training module.

The system further provides display means to enable the patient to monitor, in real time, either the training parameters, the comparison, and/or the prompts.

FIG. 5 shows the display screen of FIG. 4 together with the actual pattern of a patient's training use, seen as a solid line waveform. As the patient goes through the maneuvers involved in training, e.g., breathing in, firing the MDI, holding breath, and breathing out, he or she can follow these actions in real time, and try to cause them to stay within this idealized pattern.

As the patient begins to inhale through the device, the calculated flow rate will begin to appear on the screen, as a waveform moving left to right. At completion of all maneuvers, a software program calculates the patient's inspiratory and expiratory flow rates and volumes, length of inspiration and breath hold, and time of device actuation. These values are then compared to pre-training values for each parameter and analyzed using various algorithms.

As a result of the comparison, the system is able to provide various prompts to the patient, in order to instruct the patient, e.g, in improvements that can be made in the next training sequence. For instance, red-colored prompts can highlight areas that need to be corrected, while blue-colored prompts can highlight those areas which were done correctly.

When errors are made in the maneuvers, the patient can recycle through the modules to try again. The operator preferably will have the option to select the number of times the patient needs to perform the maneuvers correctly before exiting the system or advancing to other modules. Also, the operator will be able to set the number of trials a patient can cycle through before the computer program will interrupt calling for operator assistance. This feature will be needed for those patients who experience difficulty learning the maneuvers and may need further personal instructions by the operator before continuing with the training exercise.

Optionally, and preferably, the system further comprises one or more post-training modules, e.g., wherein the training steps can be recycled without a real time display, in order to insure compliance. Once the required number of successful inhalation maneuvers have been completed in the training module, the patient can be automatically advanced into post-training modules. In a post-training module, for instance, the patient will repeat their performance with the device, but now without the aid of seeing either their idealized pattern or their inspiratory flow pattern in real time.

The objective of such post-training is for the patient to visualize the "ideal flow pattern" in their mind and attempt to replicate it as they perform the maneuvers. Again, prompts will come onto the screen after they have completed their maneuvers, advising the patient as to their overall performance. When some number of successful trials have been achieved, the program can terminate the system by announcing to the patient that they have completed the training program.

Typically not available to the patient will be a table compiling the results of all maneuvers performed in the training and/or post-training modules. This will typically be available only to the operator, and can be used to compare the patient's progress for that session or to later sessions in which patient compliance with performance can be checked. This data could also be used in clinical studies to correlate performance with overall efficacy of the drug being administered. This could be accomplished by appending to this program, software designed to analyze standard spirometric parameters such as forced expiratory volume in one second.

Appropriate choice of software is within the skill of those in the art and provides the capability to tailor the system to various levels of complexity. For instance, a simple system can be developed for the average clinical office or a very complex system can be devised for a hospital that teaches respiratory therapy. The software also provides for patient performance to be stored, thereby allowing comparative analysis to be done between various training sessions.

The following EXAMPLES are provided to illustrate, but not limit, the present invention.

EXAMPLE

A system of the present invention was made and used in the following manner. The hardware components of the system included a standard PC computer (IBM PS/2), a 16 channel analog input board (Cat. No. UC-DAS-16G, MetraByte Corp., Taunton, Mass.) for analog to digital (A/D) conversion and digital I/O, a differential pressure transducer with associated amplifier, and a standard press and breath MDI device (3M, St. Paul, Minn.) modified along the lines of the device shown in FIG. 1, by the addition of an actuator button, a wire mesh screen as a flow sensor, and connecting ports. These modifications were made to convert it into an air flow sensing instrument.

The system was constructed in the following manner. Two holes were drilled into the base of the MDI plastic housing and two tubing connectors were connected. Several mesh screens were inserted into the mouth piece and fixed in place between the two tubing connectors, in order to provide a pressure drop across the screens as air flow through the MDI housing.

A blank (without drug or propellant) MDI canister was placed within the MDI housing in its normal position. This canister was modified by placing a button switch in the bottom of the canister. To simulate actuation of the canister, the button was depressed, thereby closing an electrical contact which sent a 5 volt signal, converted into a digital signal, to a recording device. Tubing from the differential transducer was connected to the two ports, to allow the pressure drop across the screen mesh to be sensed whenever air flowed through the MDI housing. The output from the differential transducer was also sent to a recording device.

Using the computer, the two signals from the MDI could be stored permanently. Thus, one could inhale from the MDI and actuate the canister as if it were in actual use as a delivery device. The performance parameters relating to the patient maneuvers were displayed. Thus, it was possible to visualize whether or not correct use of the MDI had occurred.

In use, as the patient inhaled through the MDI, the mesh screen caused a differential air pressure to be created across the mesh screen. This pressure differential was sensed by the transducer connected to the MDI.

The transducer was used to send an analog signal proportional to the pressure drop to the A/D converter which, in turn, passed the digital value to the central processor of the computer. There the digital value was interpreted by software algorithms to assess the patient's use of the MDI. Based on the analysis of the signals from the MDI, other software algorithms were activated, thereby constituting an overall system capable of instructing the patient on how to correctly use the MDI delivery device.

We claim:

1. An interactive system for training and educating a patient in the use of an inhalation device, the system comprising the following modules:

(1) a device comprising a housing define a chamber in communication with a patient port in the form of a mouthpiece or nasal adaptor, aerosolization means for simulating the formation of an aerosol of medicament in the chamber, actuation means to actuate the aerosolization means, and a sensor that continuously measures the inhalation flow rate during inhalation through the patient port and provides an electrical signal which varies continuously with the flow rate, the electrical signal being useful for monitoring one or more of the following performance parameters:

(a) inspiration flow rate;
(b) firing time of the inhalation device;
(c) length of inspiration;
(d) length of breath hold; and
(e) expiration flow rate;

(2) pre-training means wherein at least one of the parameters is established as a patient-specific parameter, and the reaming parameters are established either as fixed parameters or patient-specific parameters;

(3) training means for (i) collecting patient information relative to the parameters,
(ii) comparing said training parameters with the parameters established in pre-training, and
(iii) establishing patient prompts with respect to the comparison; and (4) display means to enable the patient to monitor in real time either the training parameters, the comparison, and/or the prompts, wherein the display means affords display of an X-Y axis with the Y axis representing patient air flow in change in volume per change in time units and with the X axis representing time.

2. A system according to claim 1 wherein performance parameters (c) and (d) are patient-specific, and the parameters, (a), (b), and (e), are predetermined at or before the time of pre-training.

3. A system according to claim 1 wherein modules (3) and (4) are repeated in order to improve performance or evaluate compliance.

4. A system according to claim 1 further comprising a post-training module wherein modules (3) and (4) are repeated without a real time display.

5. A system according to claim 1 further comprising a tutorial module demonstrating the proper use of inhalation devices.

* * * * *